United States Patent [19]

Schmal

[11] Patent Number: 5,435,288
[45] Date of Patent: Jul. 25, 1995

[54] DEVICE FOR INJECTING A GASEOUS FUEL INTO AN INTERNAL COMBUSTION ENGINE, AND ALSO METERING DEVICE AND PRESSURE REGULATING VALVE

[75] Inventor: Peter Schmal, Noordwijk, Netherlands

[73] Assignees: Necam B.V., Amersfoort; Koltec B.V., DG Breda, both of Netherlands

[21] Appl. No.: 75,457
[22] PCT Filed: Dec. 19, 1991
[86] PCT No.: PCT/NL91/00267
§ 371 Date: Aug. 12, 1993
§ 102(e) Date: Aug. 12, 1993
[87] PCT Pub. No.: WO92/11448
PCT Pub. Date: Jul. 9, 1992

[30] Foreign Application Priority Data

Dec. 21, 1990 [NL] Netherlands ............... 9002862

[51] Int. Cl.[6] ............................. F02M 21/04
[52] U.S. Cl. ........................................ 123/527
[58] Field of Search ........... 123/525, 526, 527, 27 GE

[56] References Cited

U.S. PATENT DOCUMENTS

| 2,682,866 | 7/1954 | Rhoades, Jr. | 123/527 |
|---|---|---|---|
| 2,817,324 | 12/1957 | Sievers | 123/527 |
| 2,972,988 | 2/1961 | Ranck | 123/527 |
| 3,987,999 | 10/1976 | Savage | 251/205 |
| 4,330,012 | 5/1982 | Chadwick | 137/625.48 |
| 4,505,249 | 3/1985 | Young | 123/527 |
| 4,597,364 | 7/1986 | Young | 123/27 GE |
| 4,638,777 | 1/1987 | Fanner et al. | 123/527 |
| 5,033,444 | 7/1991 | Kaufman et al. | 123/527 |
| 5,058,625 | 10/1991 | Kaiser et al. | 123/527 |
| 5,201,299 | 4/1993 | Kong | 123/527 |
| 5,203,305 | 4/1993 | Porter et al. | 123/527 |

FOREIGN PATENT DOCUMENTS

| 0165354 | 12/1985 | European Pat. Off. . |
|---|---|---|
| 8600062 | 8/1987 | Netherlands . |
| 8600611 | 10/1987 | Netherlands . |
| 795892 | 6/1958 | United Kingdom . |

Primary Examiner—Henry C. Yuen
Assistant Examiner—Erick Solis
Attorney, Agent, or Firm—Sandler, Greenblum & Bernstein

[57] ABSTRACT

Device for injecting a gaseous fuel into an internal combustion engine with several cylinders is provided with a vaporizer pressure regulator and metering elements for supplying the fuel from the vaporizer/pressure regulator to the inlet of the cylinders. In order to ensure a uniform supply to each cylinder, the metering elements have separate metering apertures, each of which belongs to its own cylinder, and which are connected by separate respective pipes to the cylinder. A pressure regulating valve is also provided in each pipe near the inlet of the cylinder, for the purpose of maintaining a constant pressure between the metering elements and the inlet.

20 Claims, 7 Drawing Sheets fig-1 fig-3a fig-3b fig-2

DEVICE FOR INJECTING A GASEOUS FUEL INTO AN INTERNAL COMBUSTION ENGINE, AND ALSO METERING DEVICE AND PRESSURE REGULATING VALVE

BACKGROUND OF THE INVENTION

The invention relates to a device for injecting a gaseous fuel into an internal combustion engine with several cylinders, comprising a vaporizer/pressure regulator, metering means for supplying the fuel from the vaporizer/pressure regulator to the inlet of each cylinder, as well as an injection valve provided in each pipe near the inlet of each cylinder, for maintaining a constant pressure between the metering means and each inlet. Such a device is known from Dutch Application 8,600,611. This device has a manifold header which is connected at one side to a central supply pipe supplied by the metering means, and, at the other side, is connected to a number of supply pipes each running to the inlet of a cylinder. A pressure regulating valve, for the purpose of making the pressure upstream of the valve independent of the pressure downstream of the valve, is also provided between the metering means and the manifold header.

This known device has various disadvantages. Although the pressure regulating valve used here protects the supply pipe lying upstream thereof as regards sudden pressure changes in the inlet manifold of the engine, response problems can still occur as a result of pressure equalization in the pipes situated between the pressure regulating valve and the inlet manifold.

It is also found to be difficult to supply all cylinders uniformly. The supply of the cylinders far away from the manifold header often remains lower than that of those closer to it.

SUMMARY OF THE INVENTION

The object of the invention is therefore to provide a device of the type described above which does not have these disadvantages. This is achieved in that the metering means have separate metering apertures, each aperture belonging to its own cylinder and connected by means of a separate pipe of its own to that cylinder.

Each cylinder is now supplied directly by its own metering element. The supply pipes for all cylinders can consequently be held separate in such a way that the favouring of one cylinder over another largely be avoided.

Besides, the whole supply line, running from the metering element to the inlet of the cylinder in question, is not affected by pressure fluctuations in the inlet manifold. This means that virtually no response problems can occur.

The metering means can be designed in various ways. According to a particularly attractive and relatively simple embodiment, provision is made for the metering means to have two metering elements which are displaceable relative to each other in a virtually gastight manner, and which can overlap to a greater or lesser extent for determining the passage of the metering apertures.

For an internal combustion engine, the quantity of fuel flowing through the engine varies roughly with the product of two parameters: the speed of rotation of the engine and the specific mass of the mixture. The specific mass of the mixture depends on the temperature and pressure prevailing in the inlet manifold. The metering means must therefore be regulated on the basis of these two parameters. This can be achieved in a simple manner through the fact that one element has a cylindrical space which is connected by means of a number of slits, equal to the number of cylinders, to the pipes connected to the cylinders, in which cylindrical space an externally cylindrical slide can be moved.

The slide can be controlled through being coupled to an actuator controlled by a processor which can control the actuator on the basis of the speed of rotation of the engine. The load regulation can in this case be achieved through the vaporizer/pressure regulator being connected to the inlet manifold in such a way that a pressure change in the inlet manifold produces a pressure change in the vaporizer/pressure regulator. The pressure change in the gas flow for the metering device produces a mass change of the gas, and therefore a change in the total quantity of gas supplied per unit time. The rate of flow also increases because of the pressure change. Both effects ensure the correct metering.

The processor primarily makes use of the speed of rotation of the engine. It is possible that the speed is not sufficient in certain circumstances and for certain types of engine. The processor can therefore, if desired, also control the actuator on the basis of the cooling water temperature, the pressure in the inlet manifold, the throttle valve position, the ambient temperature and pressure, the signals coming from the lambda sensor, and also on the basis of a characteristics map in which characteristic engine features are recorded.

BRIEF DESCRIPTION OF THE DRAWINGS

The invention will be described in greater detail below on the basis of an example of an embodiment with reference to the appended figures.

FIG. 9 shows a partially cut-away diagram.

DETAILED DESCRIPTION OF THE PREFERRED EMBODIMENTS

Figure 1:
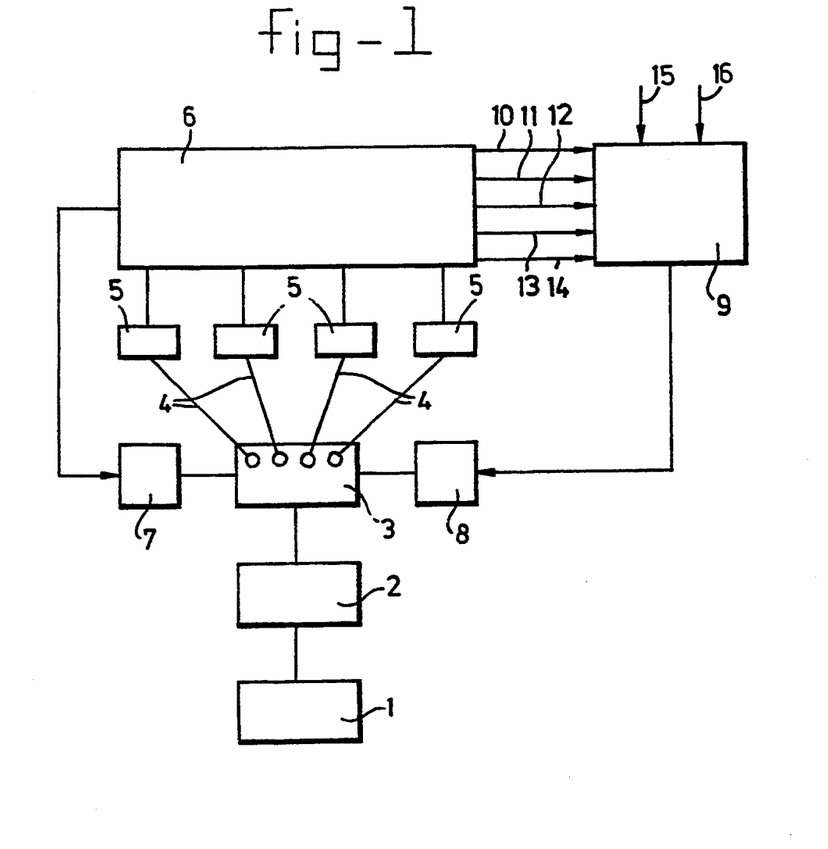
FIG. 1 shows a first block diagram of the device according to the invention.

The block diagram of FIG. 1 shows a gas tank 1 which is connected to a vaporizer/pressure regulator 2, which is in turn connected to the metering means 3. Said metering means 3 are connected by means of injection pipes 4 to injection valves 5, which are disposed near the cylinder inlets of the engine 6. The metering means 3 are controlled at one side by a pneumatic regulator 7, which is connected to the engine vacuum, and also by a stepping motor which is controlled by a processor 9. The processor 9 receives various signals from the engine 6, such as the engine speed 10, the pressure in the inlet manifold 11, data from the lambda sensor 12, and possibly further engine data such as the engine temperature 13 and the position of the throttle valve 14.

The processor 9 can also receive signals concerning the temperature of the inlet air 15 and the barometric pressure 16.

The processor has a memory in which a characteristics map can be stored, relating to characteristic engine features, such as, for example, the volumetric output. The processor 9 processes all these signals and, as stated, controls the stepping motor 8 with them.

Figure 2:
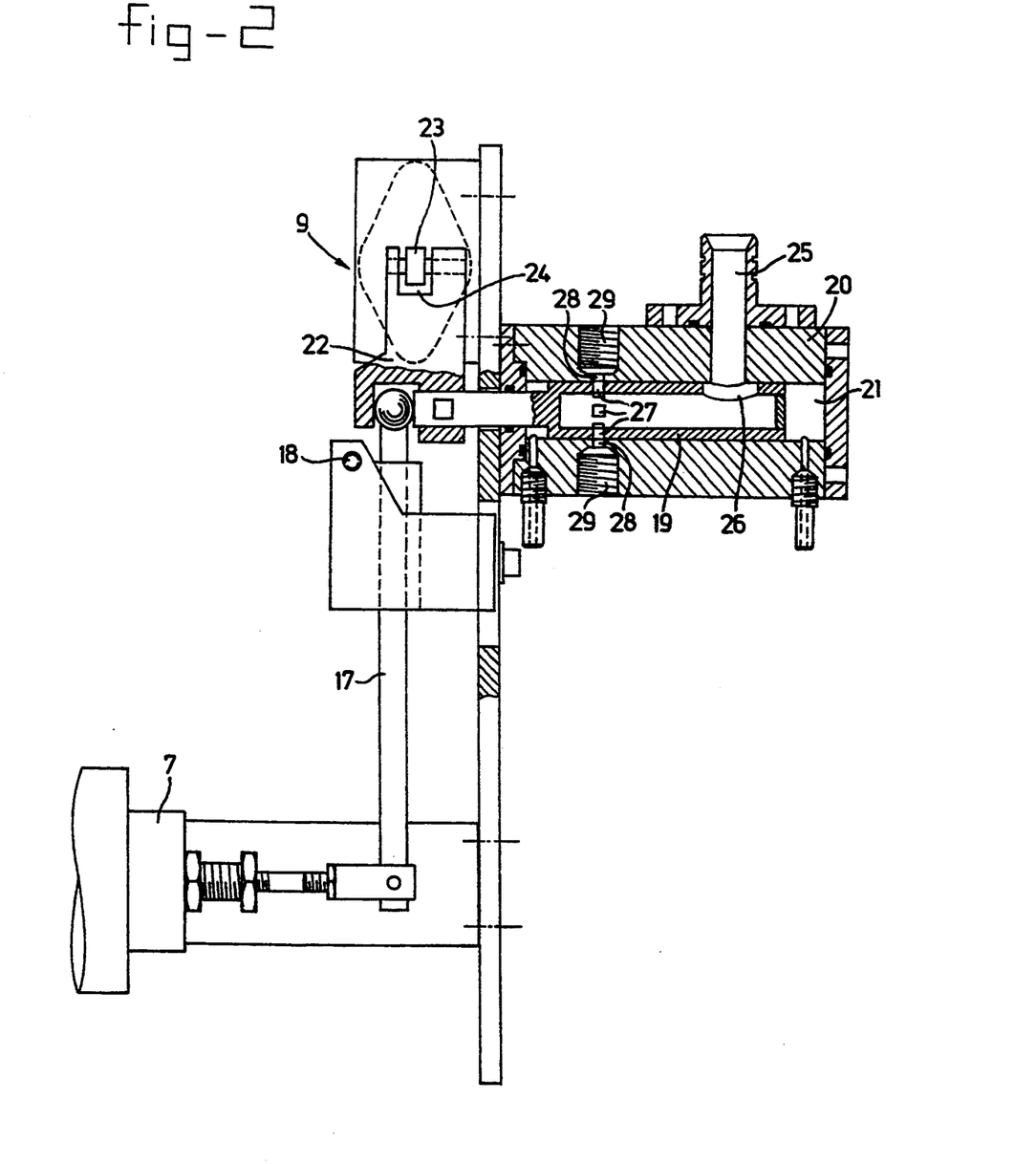
FIG. 2 shows a view, partially in cross-section, of, a first embodiment of the metering means according to the invention.

As shown in FIG. 2, the regulator 7 is connected to a lever 17 which can pivot about a hinge point 18. Movements of the regulator 7 lead to axial displacements of the hollow shaft 19 which is accommodated in the housing 20. The housing 20 has a cylindrical recess 21 in which the hollow shaft fits in a gastight manner, but in such a way that it is radially and axially displaceable.

The stepping motor 9, which is not shown in any further detail, is also connected by means of lever 22 to the hollow shaft 19, and can control the rotary movement thereof. Thanks to the play which the drive rod 23 of the stepping motor has in the jaw 24 of the lever 22, the axial movement produced by the regulator 7 remains possible.

The housing 20 has a supply channel 25 for the gaseous fuel, while the hollow shaft 19 contains a hole 26 which in any possible rotated and axial position of the hollow shaft 19 coincides with the connection 25.

The hollow shaft is also provided with four metering holes 27, which more or less coincide with four metering apertures 28 in the housing 20. Injection pipes, connected to the injection valves 5, can be connected to the metering apertures 28 by means of the internal screw thread 29.

Figure 3A:
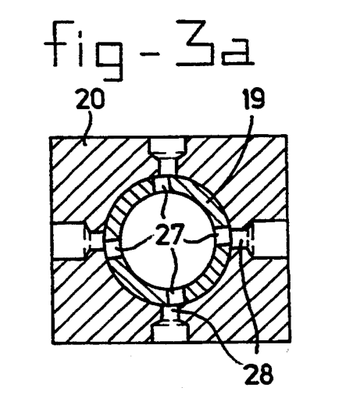
FIGS. 3a and 3b show respective radial and axial cross-sections of the metering means according to FIG. 2.
Figure 3B:
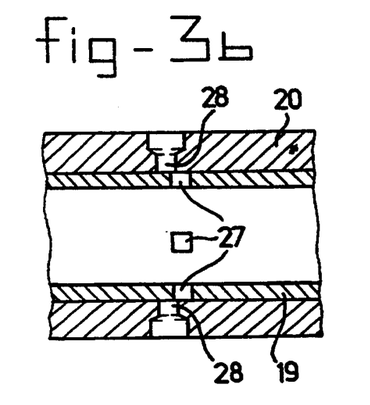

With reference to FIGS. 3a and 3b, it can be seen that the total passage, determined by each pair of apertures 27, 28, can be accurately regulated through axial movement, and movement in the direction of rotation, of the hollow shaft 19 relative to the housing 20. The quantity of gaseous fuel supplied to the injection valves 5 on the basis of the above-mentioned engine data can thus be determined.

As already mentioned, the pressures are selected in such a way that the passage through each pair of apertures 27, 28 is supercritical.

For the sake of completeness, it is further mentioned that the device according to the invention is also suitable for single-point injection.

Figure 4:
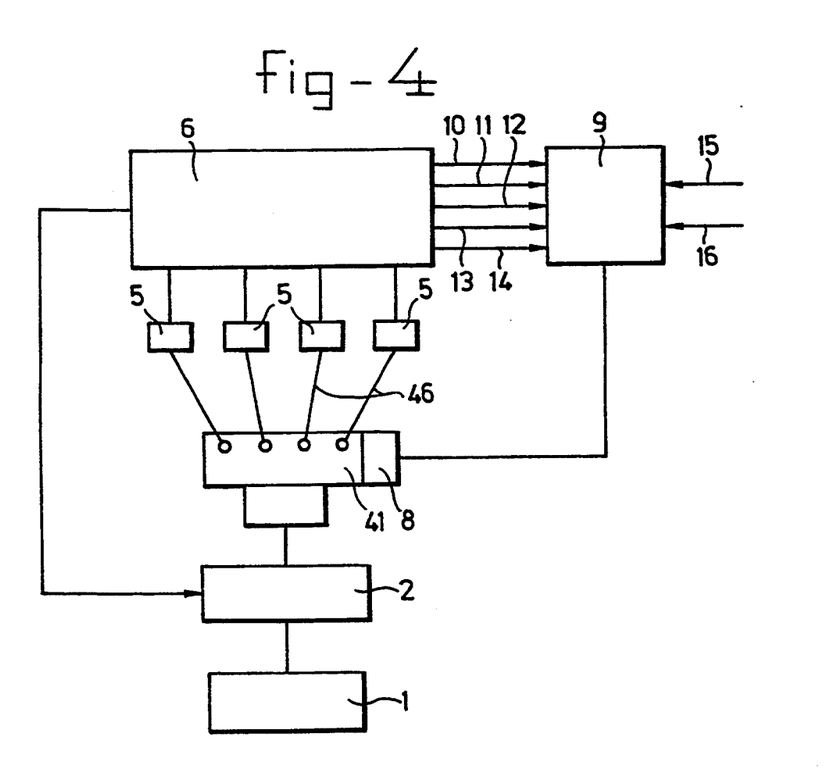
FIG. 4 shows a second block diagram.

In the second embodiment shown in FIG. 4, the load function of the engine 6, which is connected with the pressure in the inlet manifold, is coupled to the vaporizer/pressure regulator 2. At a higher pressure in the inlet manifold the vaporizer/pressure regulator is in this case opened further, so that a larger quantity of gas can flow in and the pressure downstream of the vaporizer/pressure regulator can increase.

Figure 5A:
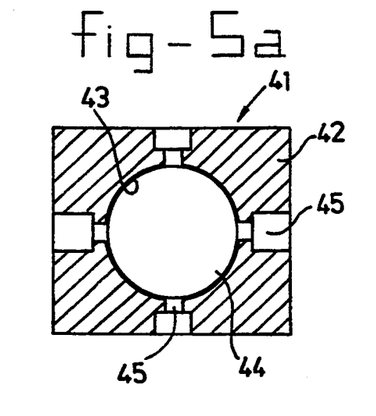
FIG. 5a and 5b shows views corresponding to FIG. 3a and 3b of a second embodiment of the metering means according to the invention.
Figure 5B:
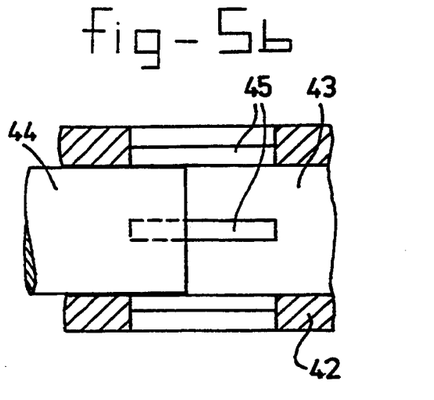

In this second embodiment a metering means 41 of the type shown in FIGS. 5a and 5b can be used. This metering means comprises a housing 42 with cylindrical bore 43, in which a pin 44 is slidable in a gastight manner. The metering apertures 45 can be opened to a greater or lesser extent by axially shifting the said pin 44. The metering apertures 45 can be rectangular. The shape need not, however, be truly rectangular. The corners can be, for example, rounded. The apertures can also run stepwise.

These metering apertures 45 are connected by means of pipes 46 to the injection valves 5, as described above with reference to FIG. 1.

Figure 6:
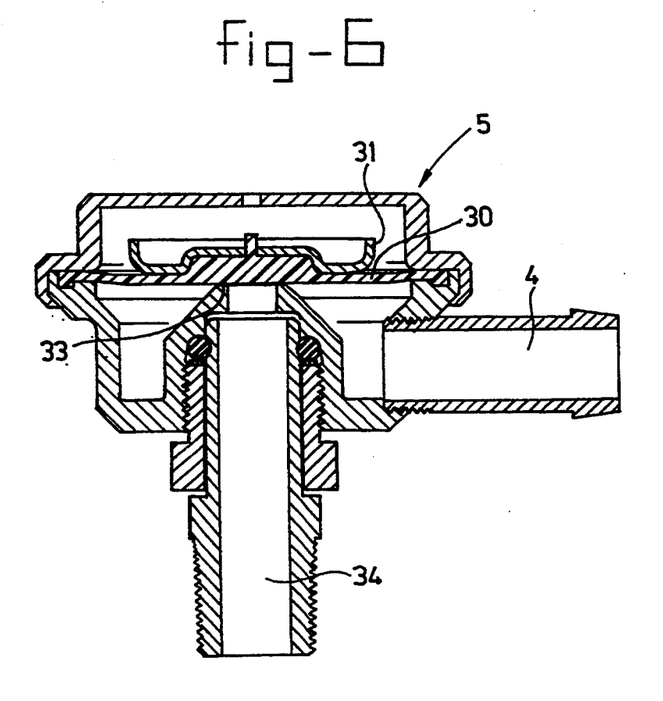
FIG. 6 shows an injection valve for the device according to the invention.

FIG. 6 shows in cross-section an injection valve 5 according to the invention. The injection pipe 4 is connected to the injection valve 5. The gas pressure acts on the diaphragm 30 which fulfils the function of valve disc. It is connected to a plate 31. When the pressure in the injection pipe 4 is great enough, the diaphragm 30, as a result of the pressure acting on the diaphragm, will be lifted from its seat 33. The gaseous fuel can then flow through the aperture 34 to the cylinder inlet.

It is important here that the surface of the valve seat 33 should be considerably smaller than that of the diaphragm 30, so that pressure variations in the cylinder inlet have virtually no influence on the diaphragm movements. The diaphragm 30 can also be connected to a spring (which is not shown). As a first possibility, a spring which presses the plate 31 onto the seat 33 can be chosen for this. According to a second possibility, a spring which pushes the diaphragm 30 away from the seat 30 can be selected. In the first case, a pressure above atmospheric pressure is maintained in the injection pipe, while in the second case a pressure below atmospheric pressure is maintained there.

Figure 7A:
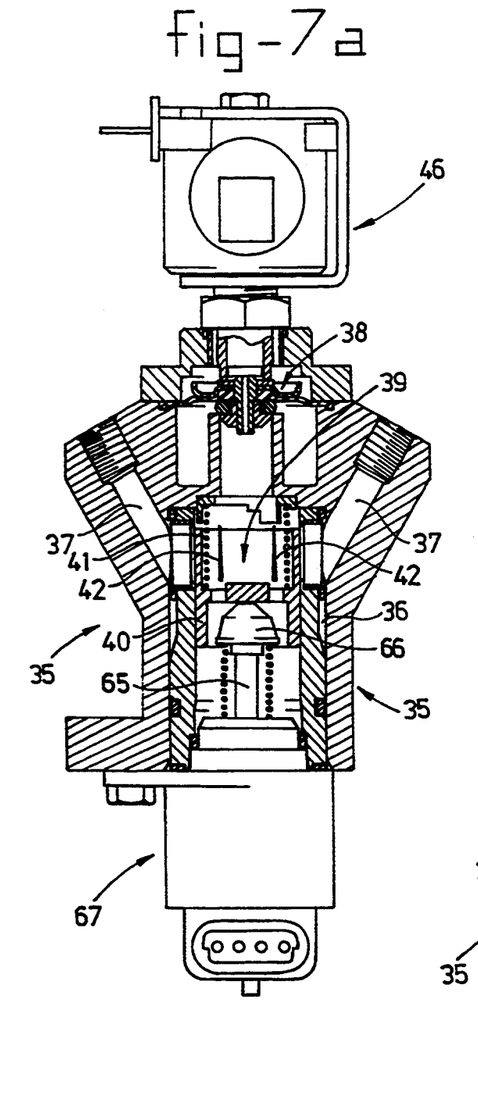
FIGS. 7a, 7b show views in cross-section of a complete metering device, closed and open.
Figure 7B:
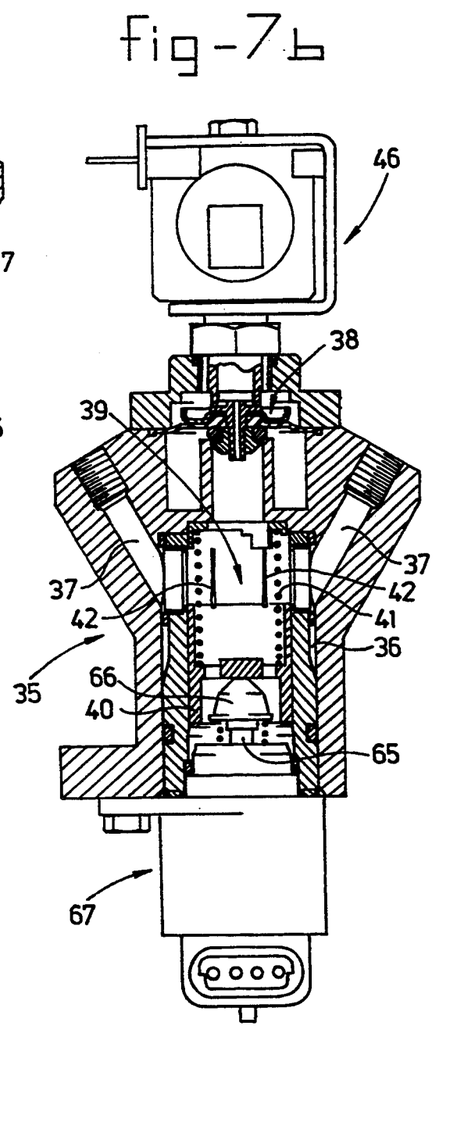

FIG. 7a and 7b show a complete embodiment of the metering means. The metering means comprise a housing 35, with a cylindrical internal bore 36. Opening into this bore are a number of connections 37, for example four or six, to which the metering pipes 4 according to the preceding figures have to be connected. The gas to be metered passes through the quick-acting dry gas valve 38 into a metering chamber indicated in general by 39. This chamber is set in the cylindrical recess 36 of the housing 35.

A piston 40, which is constantly pressed into its opened position by means of spring 41, is movable in the interior of the chamber 39. In this position it fully opens the metering slits 42. The metering slits 42 form the connection between the interior of chamber 39 and the connections 37.

The piston 40, is operated by stepping motor 67, by means of which pin 65 cab be pushed out to a greater or lesser distance. The pin 65 has a head 66 which rests against the piston 40.

As shown in FIG. 7b, the piston can be fully opened under the influence of the spring force supplied by spring 41. The pin 65 is retracted in this case.

The supply of gas to the housing 35 can be cut off completely by means of the control device 46 via the dry, gas shut-off valve 38. This is an advantage, for example, during easing off the gas. The processor 9 can be regulated here in such a way that in that case the control means 46 take the valve 38 into the fully closed position, with the result that incomplete combustion is avoided.

Figure 8A:
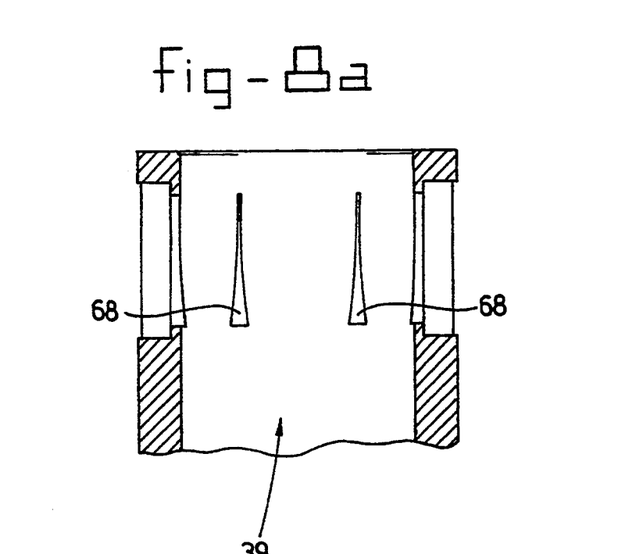
FIGS. 8a, 8b and 8e show variants of the metering means shown in FIG. 4.
Figure 8B:
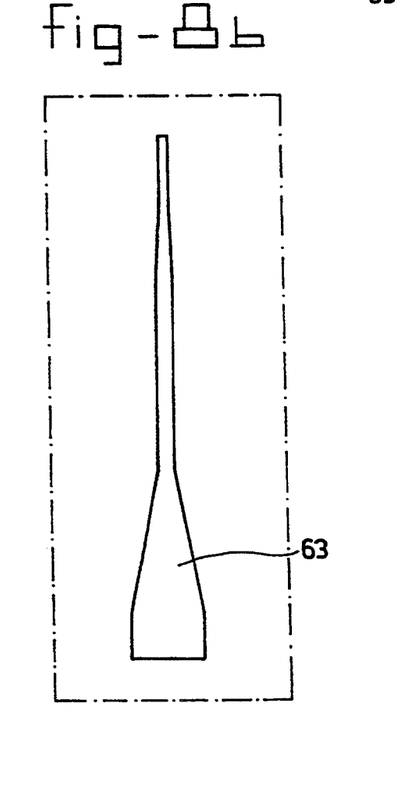
Figure 8C:
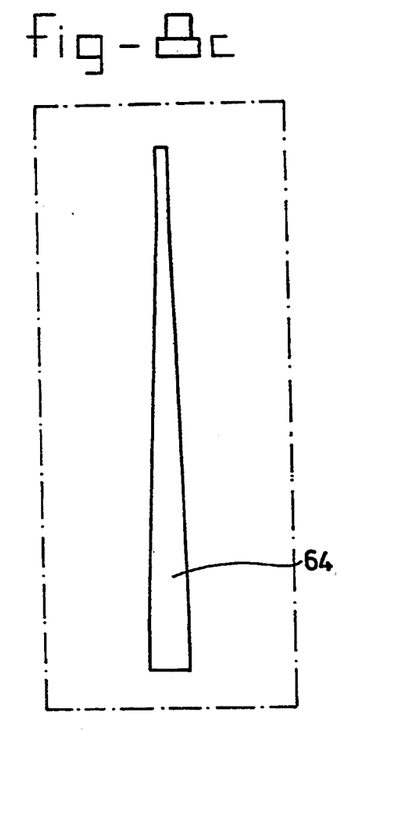

Several other variants of the metering chamber 39 are shown in FIGS. 8a to 8c. In FIG. 8a slits 68 whose longitudinal sides are parts of a circle with a large radius are used. FIGS. 8b and 8c show stepwise and tapering slits 63, 64 respectively.

The diagram shown in FIG. 9 shows a general view of the installation according to the invention, as connected to an engine. The metering device 35 shown in FIG. 7 is connected to the same number of injection valves 5 by means of a total of four pipes 4. The injection valves 5 are fitted on the inlet manifold 47 of the engine indicated in general by 48. A throttle valve with position indicator is shown at 49. The outlet 50 of the engine is also provided with a lambda sensor 51. Throttle valve position indicator and lambda sensor are connected to a microprocessor 52.

The inlet manifold 47 is also connected to a pressure sensor 53 for measuring the pressure in the inlet manifold 47, which pressure sensor 53 is also connected to the microprocessor 52.

The supply lines of the microprocessor are indicated by 54. Accessories such as a diagnostic plug 55, an indicator lamp 56 and a fuel selector switch 57 are also shown on the microprocessor. With this switch 57 it is possible to change between gas running and petrol running.

Three relays 60, 59, 58 are also connected to a microprocessor 52. They serve to switch on and switch off the petrol injection valves when the switch-over to gas running is being made, and to switch on metering device 35 and the vaporizer/pressure regulator 61.

The vaporizer/pressure regulator 61 is also shown, connected by means of pipe 62 to the metering device 35, and by means of compensating pipe 63 to the inlet manifold 47.

I claim:

1. Device for injecting a gaseous fuel into an internal combustion engine having a plurality of cylinders, comprising:
    a vaporizer/pressure regulator;
    means for metering for supplying fuel from said vaporizer/pressurizer to an inlet of each cylinder of the plurality of cylinders, said means for metering comprising separate metering apertures, with each metering aperture adapted to be associated with a separate cylinder by a separate pipe; and
    an injection valve in each pipe near the inlet of each cylinder to maintain a constant pressure between said means for metering and each inlet.

2. The device according to claim 1, wherein said means for metering and said metering apertures comprise a first metering element including first metering apertures and a second metering element including second metering apertures, said first metering element and said second metering element being displaceable with respect to each other in a substantially gas-tight overlapping manner, so that alignment of said first metering apertures and said second metering apertures is variable.

3. The device according to claim 2, wherein said first metering element comprises a cylindrical space, said first metering apertures comprise a plurality of slits, equal to a number of cylinders, connected to the pipes connected to the cylinders, and the second metering element comprises an externally movable cylindrical slide which is slidable in said first metering element.

4. The device according to claim 3, comprising an actuator controlled by a processor coupled to said externally movable cylindrical slide.

5. The device according to claim 4, wherein said processor controls said actuator on a basis of speed of rotation of the engine.

6. The device according to claim 5, wherein said processor further controls said actuator on a basis of cooling water temperature, pressure in an inlet manifold, throttle valve position, ambient temperature and pressure, signals from a lambda sensor, and a basis of a characteristics map in which characteristic engine features are recorded.

7. The device according to claim 3, wherein said vaporizer/pressurizer is connected to an inlet manifold of an internal combustion engine so that a pressure change in the inlet manifold produces a pressure change in said vaporizer/pressurizer.

8. The device according to claim 7, wherein a processor controls an actuator coupled to said externally movable cylindrical slide on a basis of cooling water temperature, pressure in an inlet manifold, throttle valve position, ambient temperature and pressure, signals from a lambda sensor, and a basis of a characteristics map in which characteristic engine features are recorded.

9. The device according to claim 3, wherein said externally movable cylindrical slide is slidable in an axial direction, and said plurality of slits are longitudinally shaped having a greatest dimension oriented in the axial direction.

10. The device according to claim 9, wherein said plurality of slits are at least partially rectangular.

11. The device according to claim 9, wherein said plurality of slits comprise at least one tapering part connected to a rectangular part.

12. The device according to claim 9, wherein said plurality of slits comprise two rectangular parts connected by a tapering part.

13. The device according to claim 9, wherein said plurality of slits comprise three rectangular parts connected in pairs in each case by a tapering part.

14. The device according to claim 1, wherein said means of metering comprise a quick-acting shut-off valve for shutting off a supply of gas.

15. The device according to claim 1, wherein said injection valve comprises a valve housing containing a valve seat and a valve disk interacting with said valve seat, and said valve disk comprises a diaphragm positioned in said valve housing, so that said diaphragm when under no load just rests against said valve seat.

16. In combination, an internal combustion engine comprising a plurality of cylinders, and a device for injecting a gaseous fuel into the internal combustion engine, said device comprising:
    a vaporizer/pressure regulator;
    means for metering for supplying fuel from said vaporizer/pressurizer to an inlet of each cylinder of the plurality of cylinders, said means for metering comprising separate metering apertures, with each metering aperture adapted to be associated with a separate cylinder by a separate pipe; and
    an injection valve in each pipe near the inlet of each cylinder to maintain a constant pressure between said means for metering and each inlet.

17. The combination according to claim 16, wherein said means for metering and said metering apertures comprise a first metering element including first metering apertures and a second metering element including second metering apertures, said first metering element and said second metering element being displaceable with respect to each other in a substantially gas-tight overlapping manner, so that alignment of said first metering apertures and said second metering apertures is variable.

18. The combination according to claim 17, wherein said first metering element comprises a cylindrical space, said first metering apertures comprise a plurality of slits, equal to a number of cylinders, connected to the pipes connected to the cylinders, and the second metering element comprises an externally movable cylindrical slide which is slidable in said first metering element.

19. The combination according to claim 18, comprising a processor coupled to said externally movable cylindrical slide.

20. The combination according to claim 18, wherein said externally movable cylindrical slide is slidable in an axial direction, and said plurality of slits are longitudinally shaped having a greatest dimension oriented in the axial direction.

* * * * *